July 16, 1940.    G. F. MARCIANO    2,208,336
GOGGLE
Filed April 22, 1938
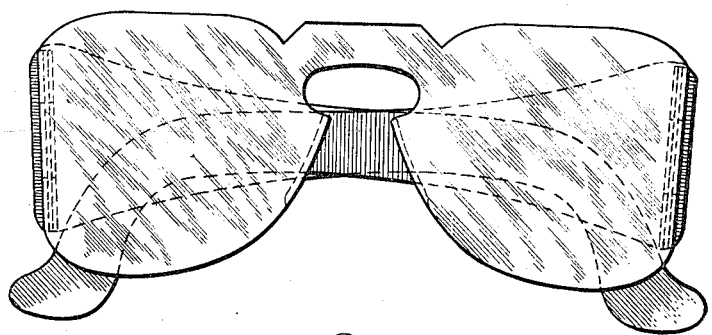
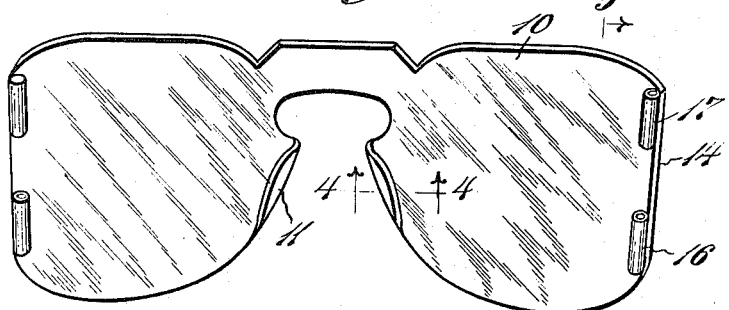
INVENTOR.
Gerardo F. Marciano.
BY Barlow & Barlow
ATTORNEYS.

UNITED STATES PATENT OFFICE 2,208,336

GOGGLE

Gerardo F. Marciano, Providence, R. I., assignor to Universal Optical Corporation, a corporation of Rhode Island Application April 22, 1938, Serial No. 203,579

3 Claims. (Cl. 2—12)

This invention relates to a goggle or glare shield for the eyes; and has for one of its objects to provide an extremely simple and inexpensive structure which may be made at a minimum cost.

Another object of the invention is to shield the eyes from light glare forwardly and also from the sides of the user.

Another object of the invention is to provide a substantially all-nonmetallic structure inclusive of parts of the hinge.

A further object of the invention is to provide a structure which will eliminate the necessity of placing separate lenses or transparent portions in rims or in front of the frame for vision.

With these and other objects in view, the invention consists of certain novel features of construction, as will be more fully described, and particularly pointed out in the appended claims.

In the accompanying drawing:

Fig. 1 is a face view of the goggle with the temples folded;

Fig. 2 is a perspective view of the back side of the front of the goggle;

Fig. 3 is a section on line 3—3 of Fig. 2;

Fig. 4 is a section on line 4—4 of Fig. 2;

Fig. 5 is a perspective view of one of the temples;

Fig. 6 is sectional view showing the relation of the temple and front with the hinge in operating position;

Fig. 7 is a fragmental front view of a modified form of front;

Fig. 8 is a sectional view on line 8—8 of Fig. 7.

Usually goggles are formed like other spectacles with some sort of a rim and a lens mounted in the rim; however, often the frame is so shaped that a circular portion about the lens supplies such protection as is desired against side glare. In order to provide an extremely simple device and yet one which will protect the eyes against light glare from the side as well as from forward, I have provided a front made of a sheet of Celluloid or some transparent material of an amber or other color which will have the correct light softening or diminishing effect and have formed temples which are of the same material and of a width to shield the eyes from glare from the side, these also being formed of sheet stock with the front and temples hinged together by means of Celluloid tubes on each of the parts; and the following is a more detailed description of the present embodiment of this invention, illustrating the preferred means by which these advantageous results may be accomplished:

With reference to the drawing, 10 designates the front of the goggle which is cut in the desired shape from a transparent sheet of Celluloid or like material having a color to soften the glare upon the eyes, such for instance as amber. The nose rests or pads 11 are folded rearwardly by softening and bending the thermoplastic sheet which completes the formation of the front, it being noted that there are no separate rims and lens or bridge which is usually present in a front of this character.

The temples 12 are cut from sheet stock of the same material as the front and of the shape shown in Fig. 5 and of a width 13 at their forward portion sufficient to shield the eyes from side light glare, these being mounted along the straight edge 14 of the front and provided with a curvature at the point 15 to extend over the ears and fit the head.

Hinges for joining the temple 12 to the front 10 are provided by short tubular sections of Celluloid material usually of a color similar to that of the amber color of the front or temples. The tubes are in three sections 16, 17 and 18, the sections 16 and 17 being secured to the edge 14 of the front with a space between them of the length of the section 18, the section 18 being secured to the temple 12 and positioned between the sections 16 and 17 in alignment therewith for the reception of a metal pintle 19 which is flared or otherwise spread at one or both ends to hold the same in assembled position. By the use of non-metallic Celluloid tubular sections 16, 17 and 18 these may be secured to the Celluloid front and temple by some suitable solvent or cement or fusing by heat to cause the two similar materials to weld together. The hinge has the pintle disposed at an angle to the vertical.

While it is preferred to make the front out of a single piece of sheet material in order that a variation may be had and cause the goggles to look more like conventional goggles now in use, I may form the front of the shape indicated in Fig. 1 from a sheet of non-transparent or less transparent material, as indicated at 20 in Fig. 7 and then cut from the frame 20 sight openings 21 and cement or fuse a transparent sheet of Celluloid 22 into the openings, there then being a different color between the Celluloid 22 and the remainder of the front forming what may be considered as rims and bridge piece of contrasting material. With a construction of this character the temples may be of the same material as shown at 22 or the same material as shown at 20 as desire dictates, while the hinge may be of any desired color material which will harmonize or match with the other material used.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. The combination in a goggle hinge of two flat pieces of transparent sheet material, one of which pieces comprises a front eye member of a goggle and the other of said pieces comprises a temple having a flat front end, said front eye member having two tubular hinge sections fixed to its back surface at a position inwardly of the temple edge of the eye member and located in spaced relationship above one another at each of the opposite side edges of the front eye member with the bores of the hinge sections in alignment, a tubular hinge section fixed to the inner face of the temple at a position inwardly of the forward edge of the same and of a length to be inserted in the space between the two spaced hinge sections with the bores of all the hinge sections being aligned in the assembled relation of the hinge, each of said tubular hinge sections consisting of a separate short piece of non-metallic tubular material, and a metal pintle projecting through all the hinge sections of the hinge and about which they swing.

2. The combination in a goggle hinge of two flat pieces of Celluloid, one of which pieces comprises a front eye member of a goggle and the other of said pieces comprises a temple having a flat front end, said front member having two tubular hinge sections fixed to its back surface at a position inwardly of the temple edge of the eye member and located in spaced relationship above one another at each of the opposite side edges of the front eye member with the bores of the hinge sections in alignment, a tubular hinge section fixed to the inner face of the temple at a position inwardly of the forward edge of the same and of a length to be inserted in the space between the two spaced hinge sections with the bores of all the hinge sections being aligned in the assembled relation of the hinge, each of said tubular hinge sections consisting of a separate short tubular piece of Celluloid, and a metal pintle projecting through all the hinge sections of the hinge and about which they swing.

3. The combination in a goggle hinge of two flat pieces of transparent sheet material, one of which pieces comprises a front eye member of a goggle and the other of said pieces comprises a temple having a flat front end, said front eye member having two tubular hinge sections secured to its back surface at a position inwardly of the temple edge of the eye member and located in spaced relationship above one another at each of the opposite side edges of the front eye member with the bores of the hinge sections in alignment, a tubular hinge section fixed to the inner face of the temple at a position inwardly of the forward edge of the same and of a length to be inserted in the space between the two spaced hinge sections with the bores of all the hinge sections being aligned in the assembled relation of the hinge, each of said tubular hinge sections consisting of a separate short piece of non-metallic tubular material, and a metal pintle projecting through all the hinge sections of the hinge and about which they swing, said hinge pintle being disposed at an angle to the vertical.

GERARDO F. MARCIANO.